US011315598B2

(12) United States Patent
Dieckmann

(10) Patent No.: US 11,315,598 B2
(45) Date of Patent: Apr. 26, 2022

(54) FLOATING HEAD SHELL FOR A SELF PROPELLED, TANGENTIALLY TRACKING TONE ARM

(71) Applicant: Ralf Eckehart Dieckmann, Prescott, AZ (US)

(72) Inventor: Ralf Eckehart Dieckmann, Prescott, AZ (US)

( * ) Notice: Subject to any disclaimer, the term of this patent is extended or adjusted under 35 U.S.C. 154(b) by 0 days.

(21) Appl. No.: 16/948,174

(22) Filed: Sep. 6, 2020

(65) Prior Publication Data
US 2021/0090604 A1 Mar. 25, 2021

Related U.S. Application Data

(60) Provisional application No. 62/903,713, filed on Sep. 20, 2019.

(51) Int. Cl.
*G11B 3/04* (2006.01)
*G11B 17/16* (2006.01)

(52) U.S. Cl.
CPC ............. *G11B 17/16* (2013.01); *G11B 3/04* (2013.01)

(58) Field of Classification Search
None
See application file for complete search history.

(56) References Cited

U.S. PATENT DOCUMENTS

| 3,281,154 | A | * | 10/1966 | Schmetter | G11B 3/20 369/247.1 |
| 3,291,488 | A | * | 12/1966 | Dally | G11B 3/42 369/247.1 |
| 3,404,895 | A | * | 10/1968 | Hathaway | G11B 3/42 369/256 |
| 3,963,246 | A | * | 6/1976 | Trochimowski | G11B 3/12 369/253 |
| 4,121,836 | A | * | 10/1978 | Cheeseboro | G11B 3/10 369/249.1 |
| 4,722,080 | A | * | 1/1988 | Dieckmann | G11B 3/38 369/250 |
| 8,576,687 | B1 | * | 11/2013 | Schroder | G11B 3/34 369/222 |

* cited by examiner

*Primary Examiner* — William J Klimowicz

(57) ABSTRACT

A pivoting, passive servo controlled, self propelled and tangentially tracking tone arm, featuring a floating head shell/transducer assembly that tracks the groove in a disk-record independently of the tone arm itself and utilizing the so-called inward force to propel the tone arm across the disk record.

8 Claims, 13 Drawing Sheets

Figure 1:
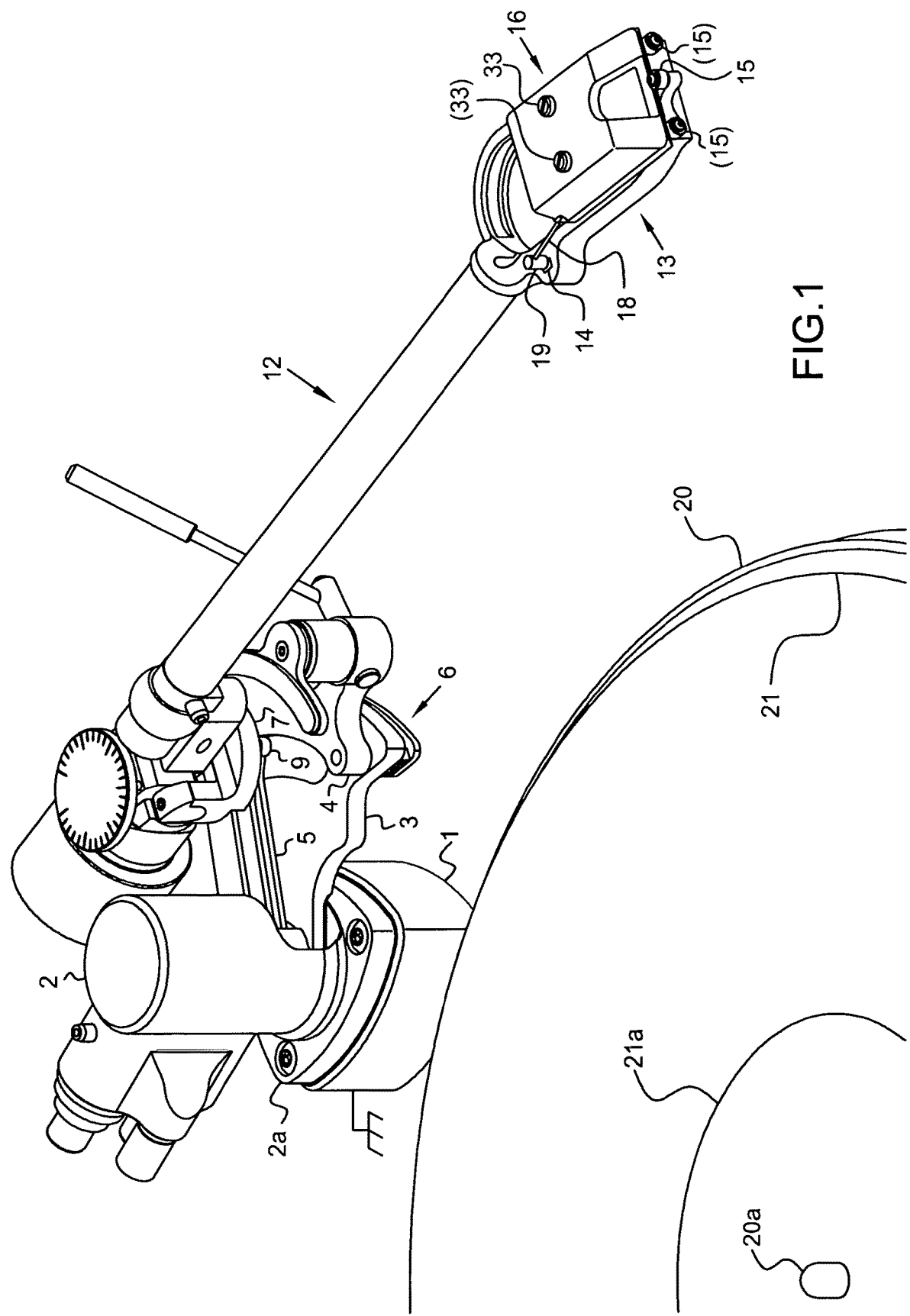
Figure 2:
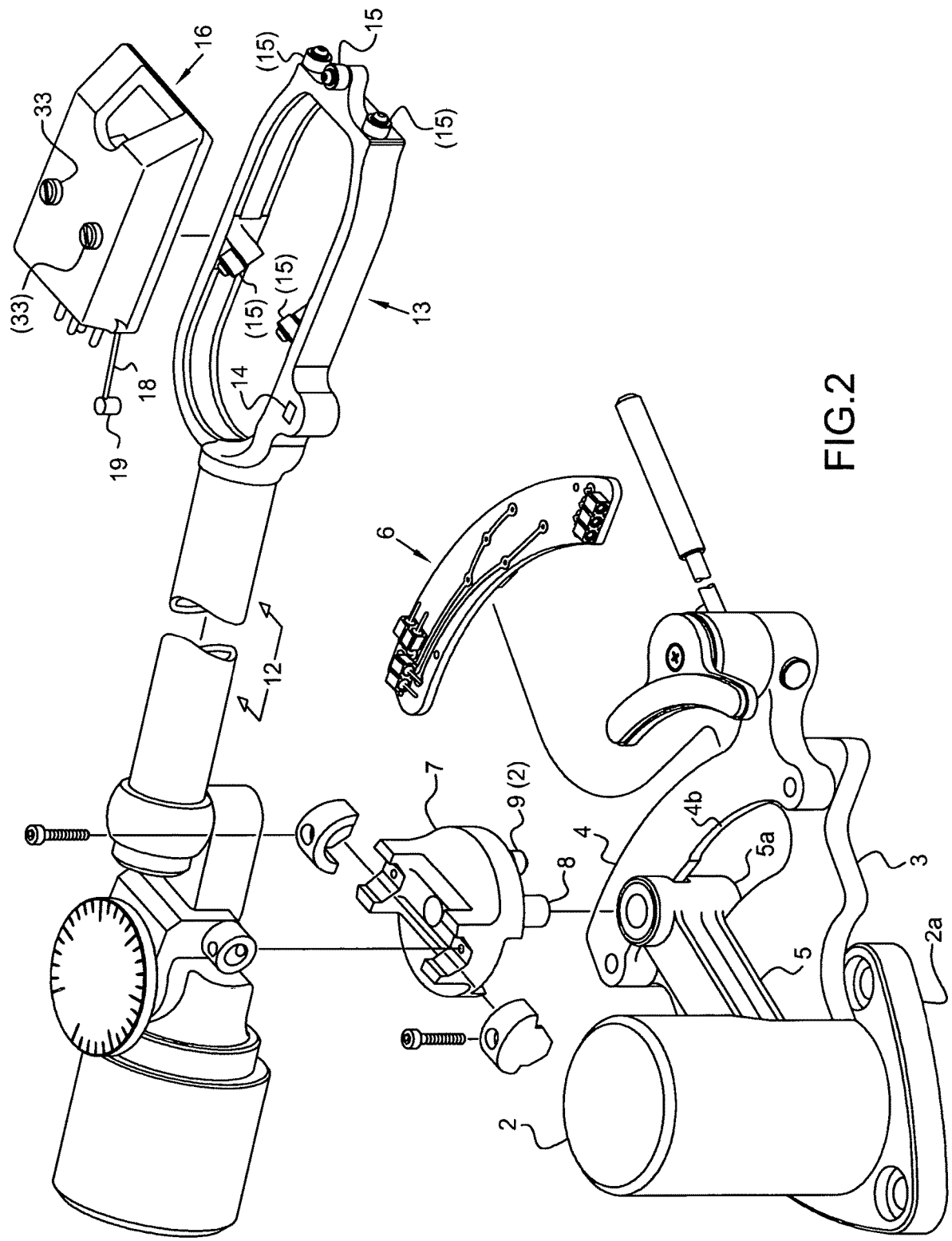
Figure 3:
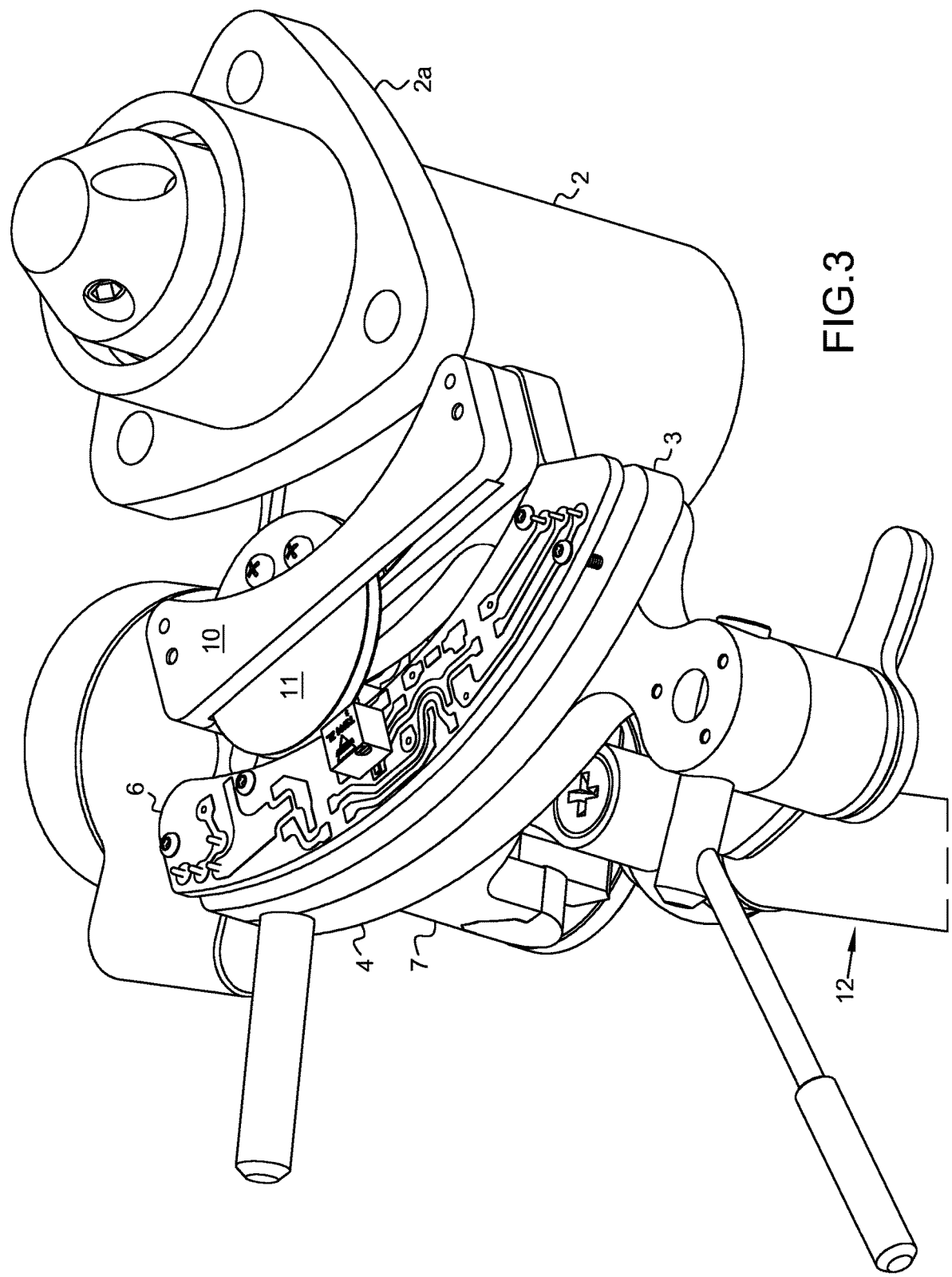
Figure 4:
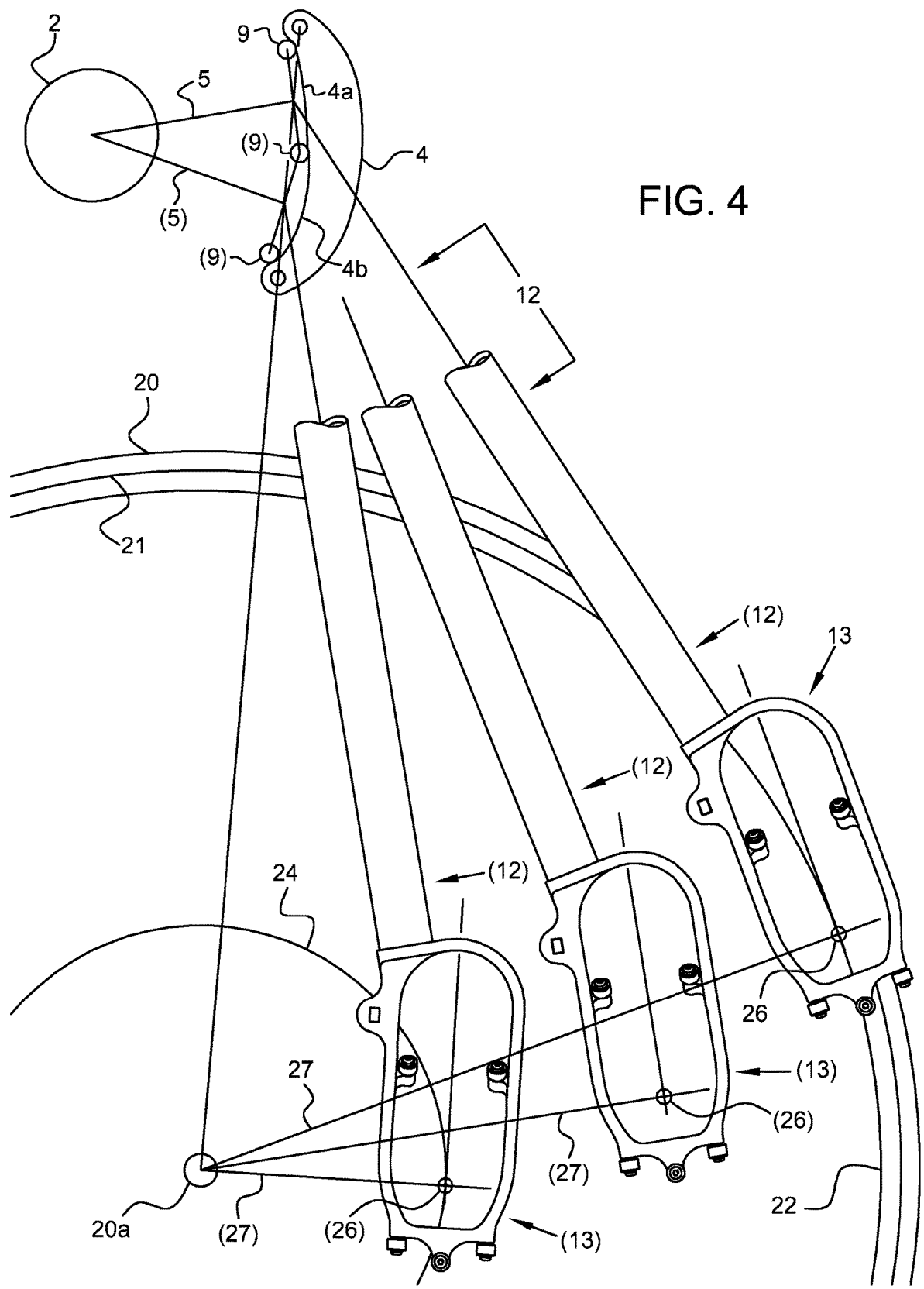
Figure 6:
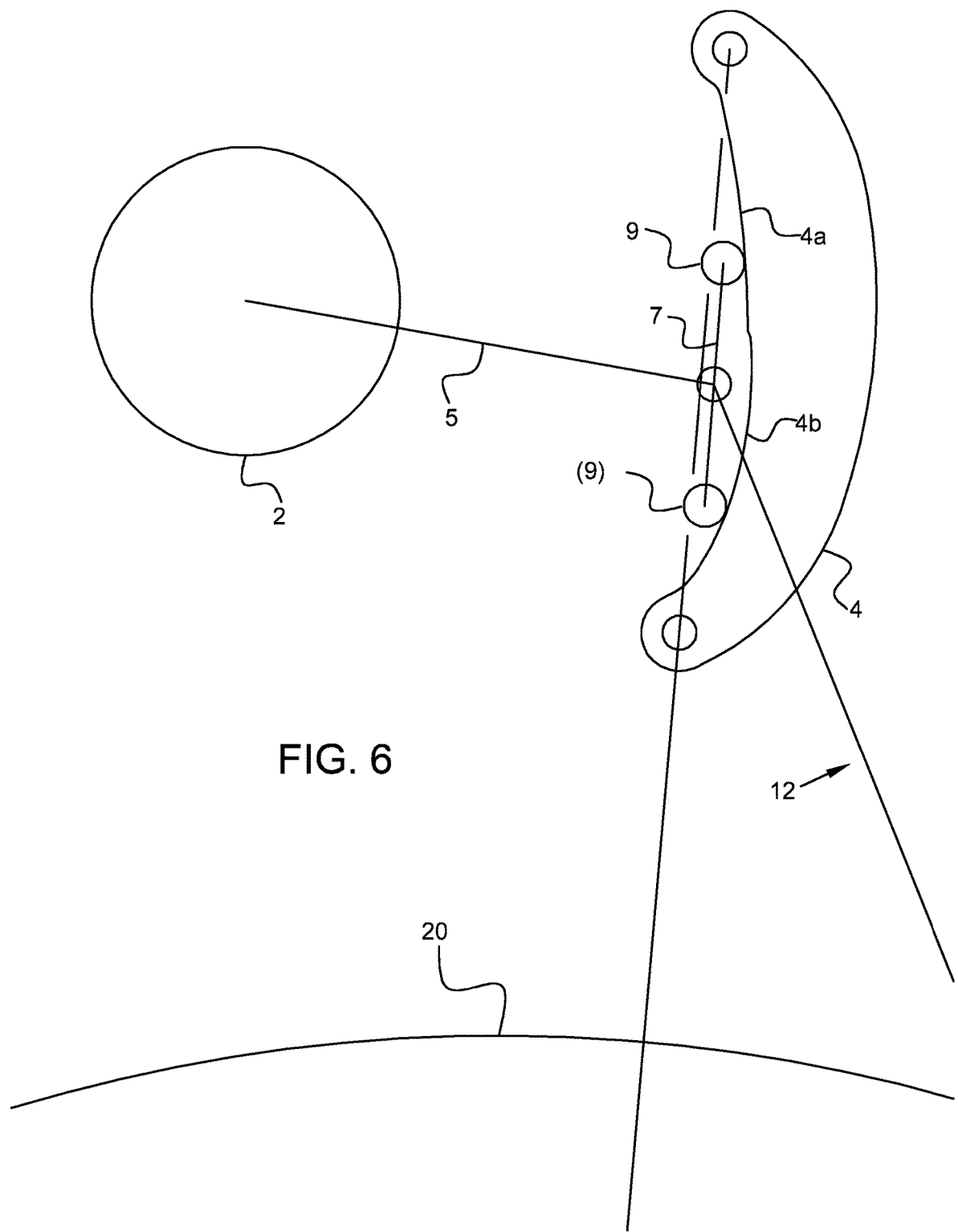
Figure 7:
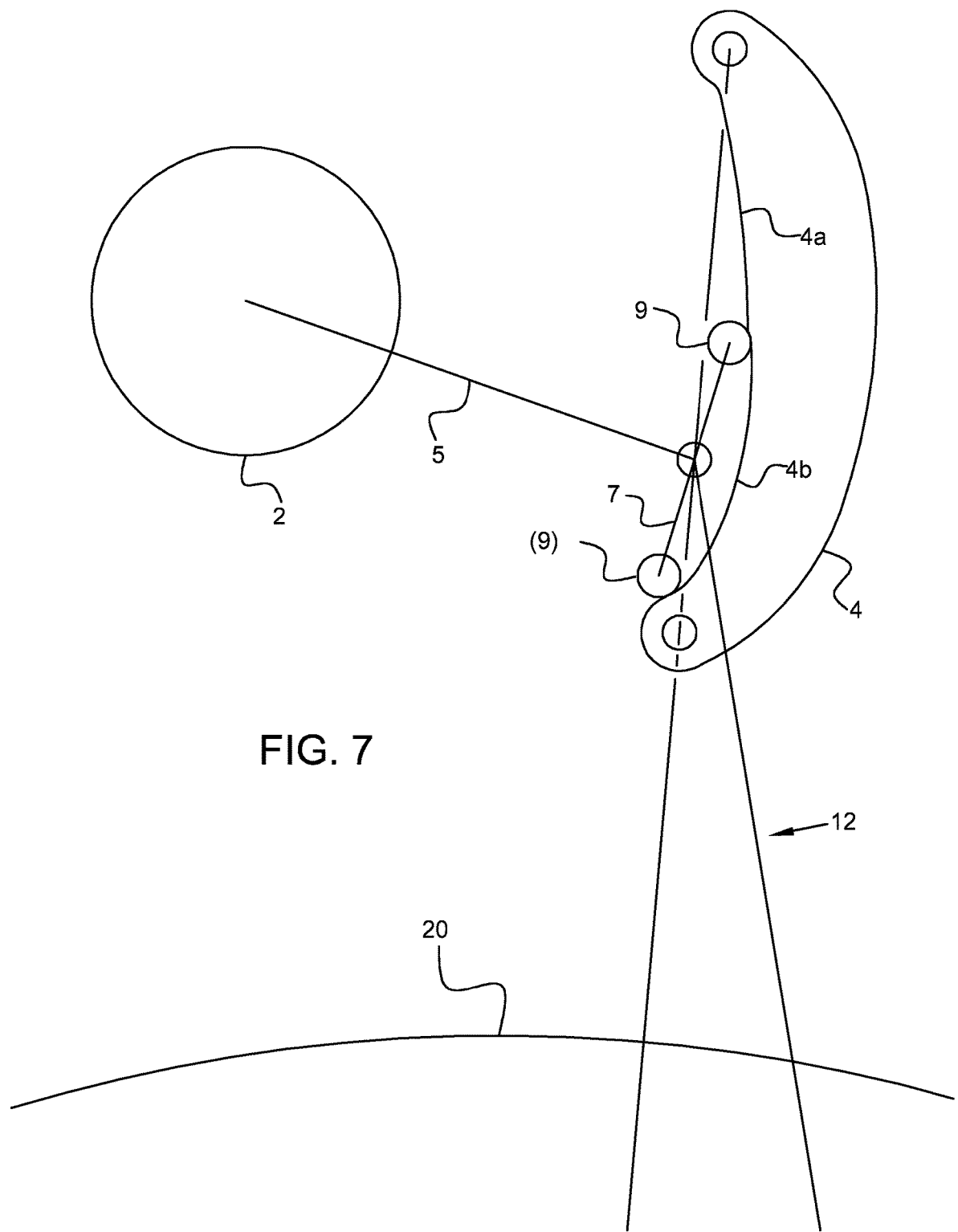
Figure 8:
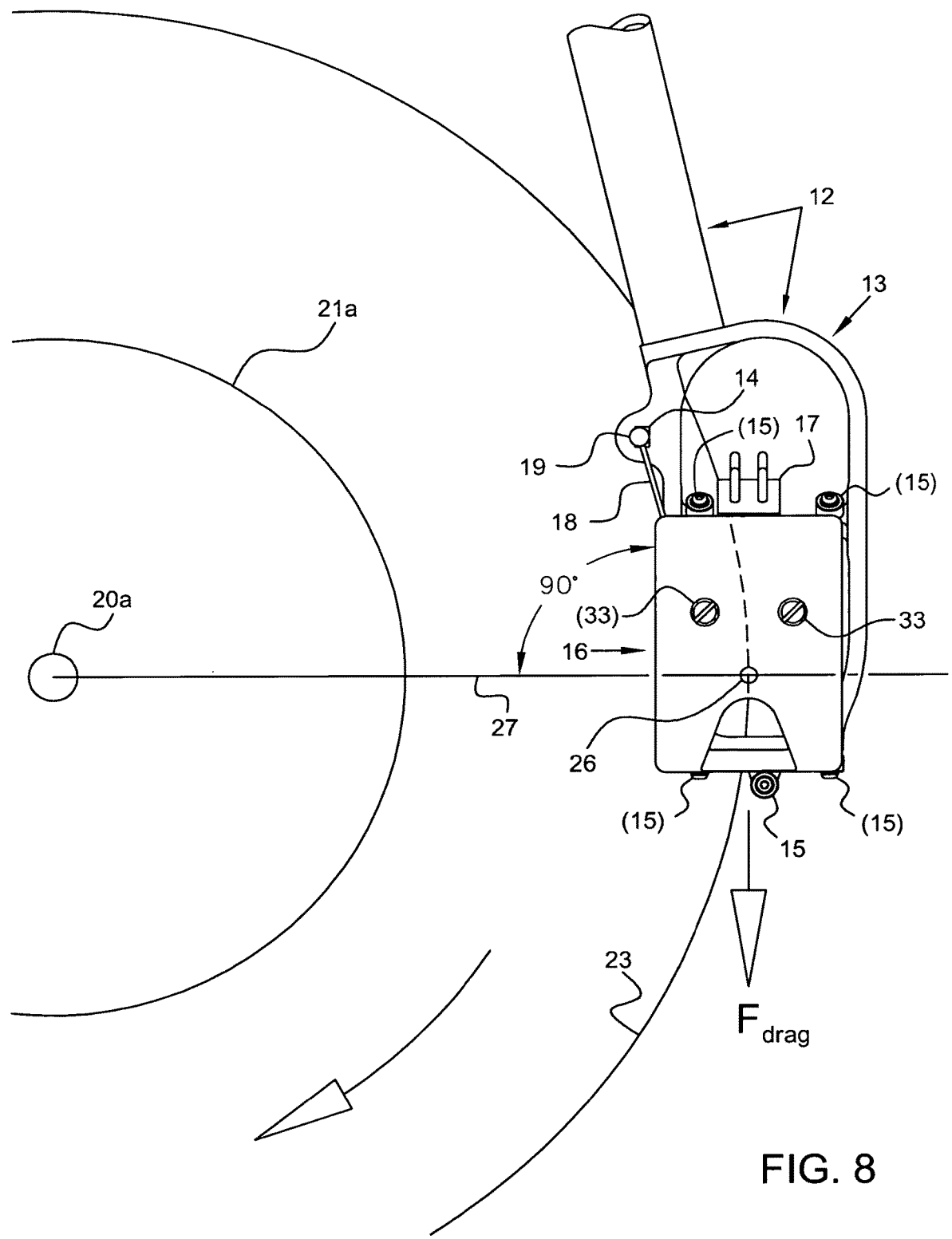
Figure 9:
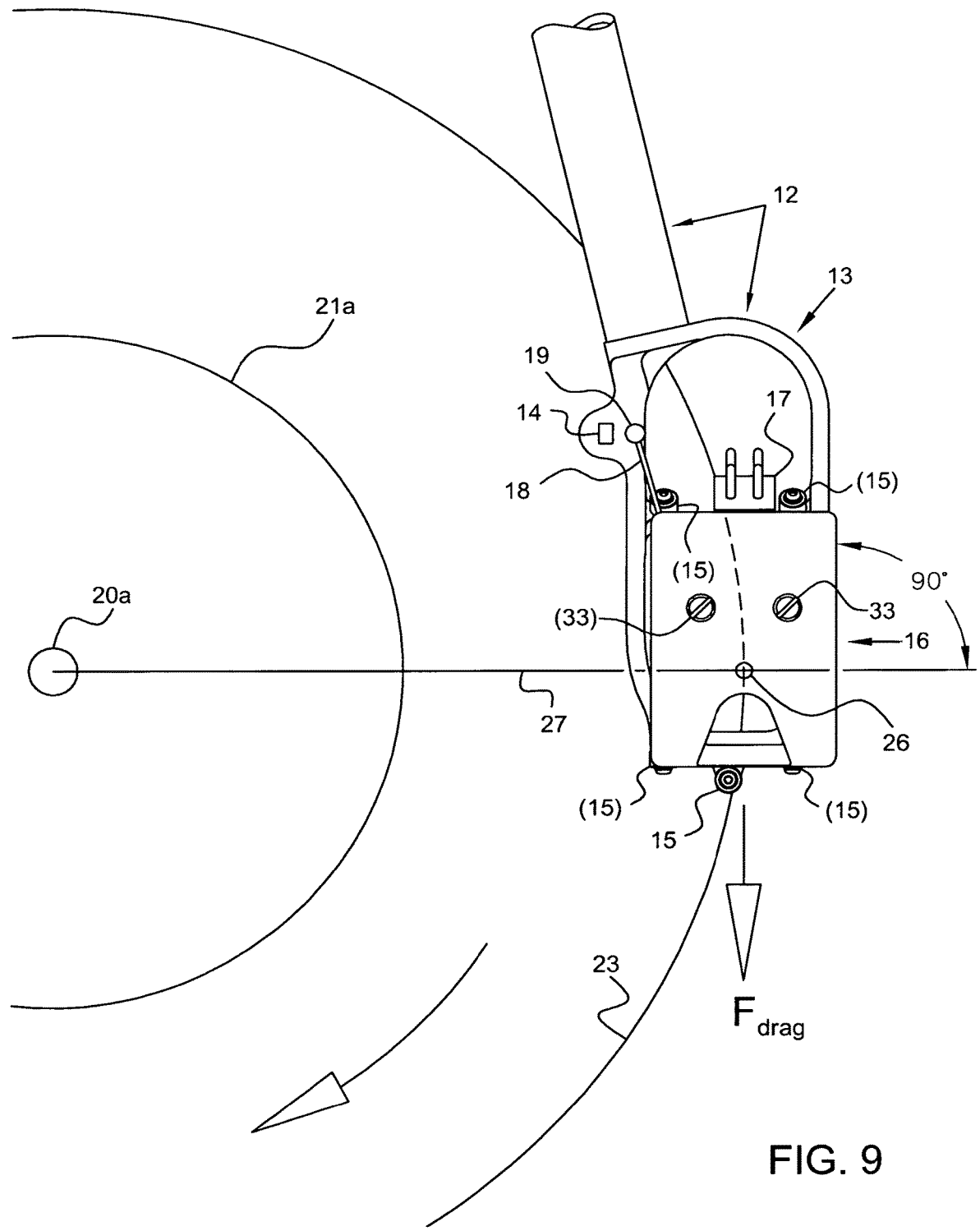
Figure 10:
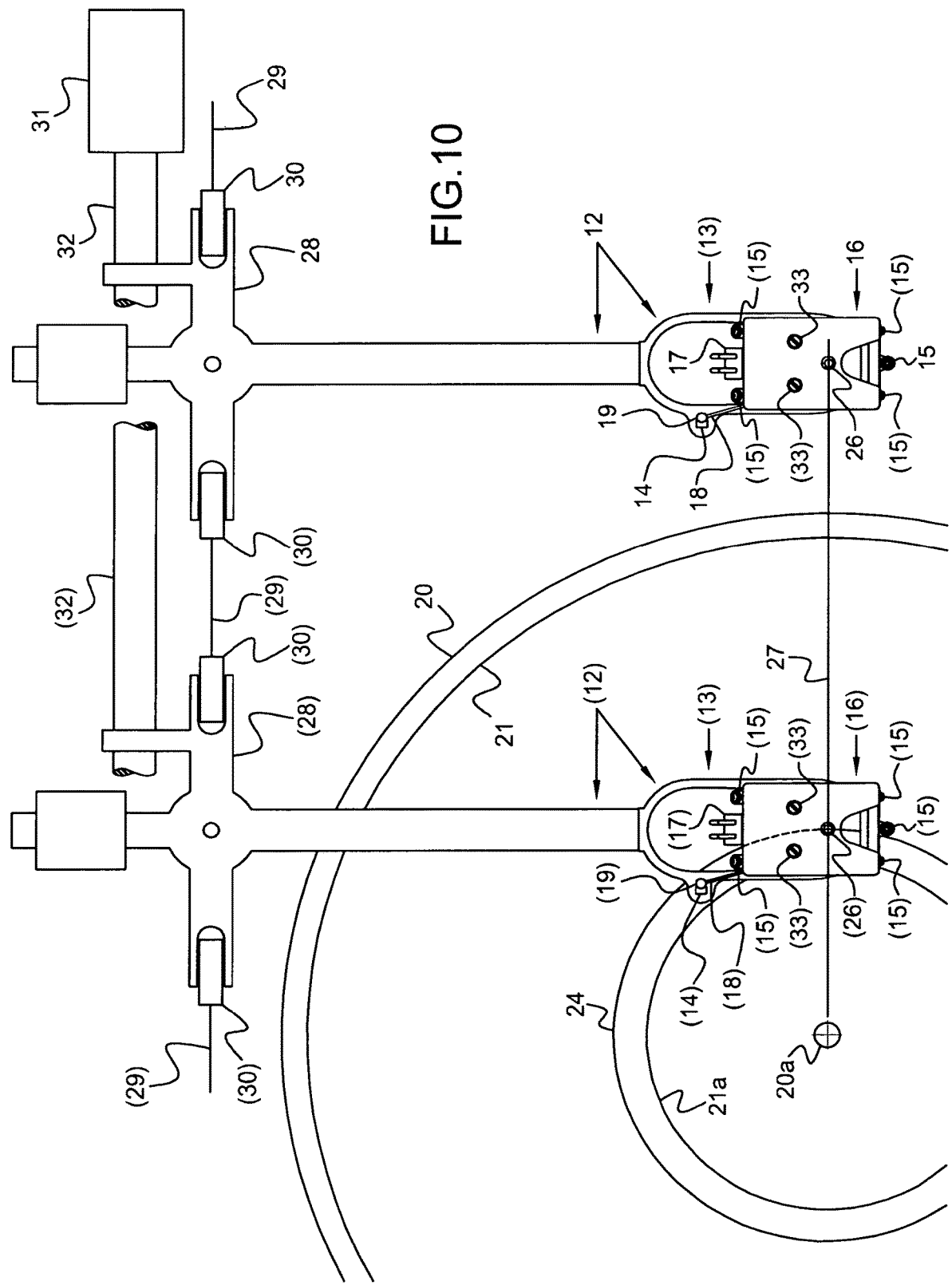
Figure 11:
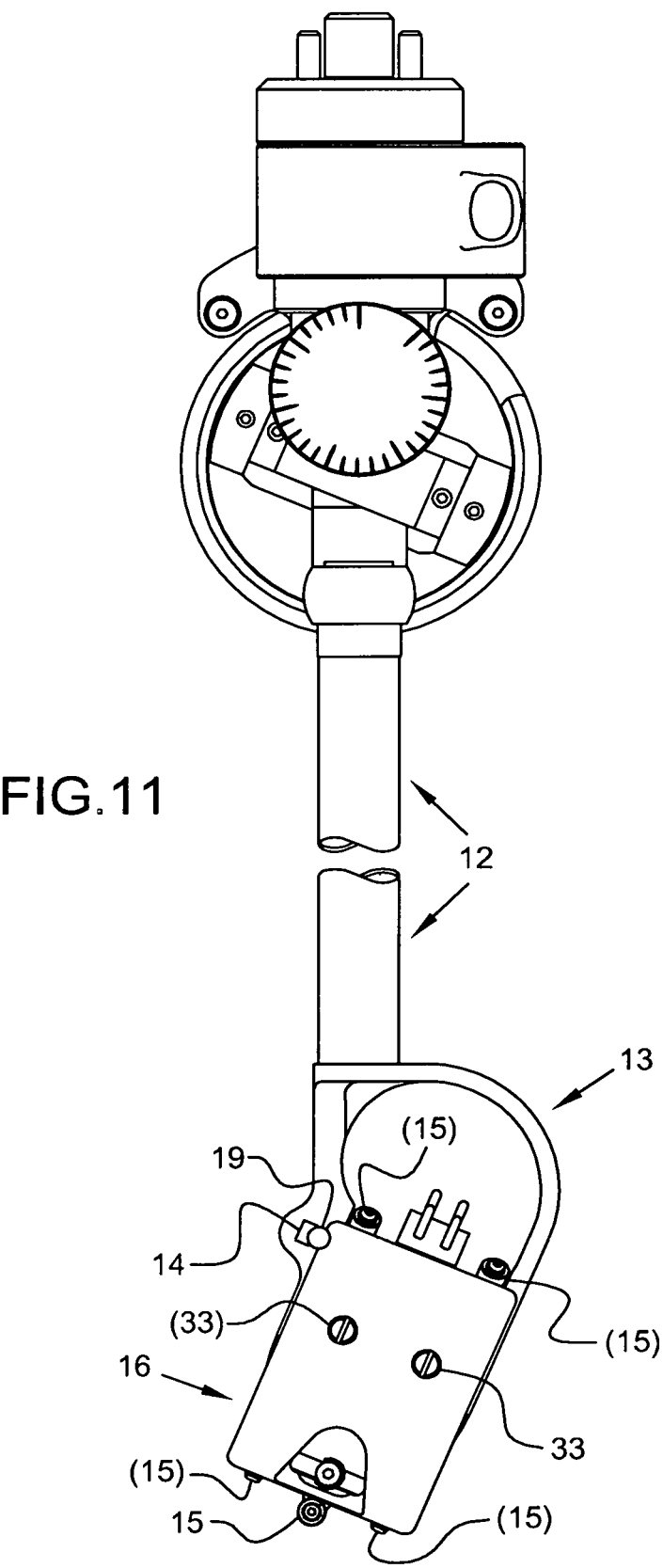
Figure 12:
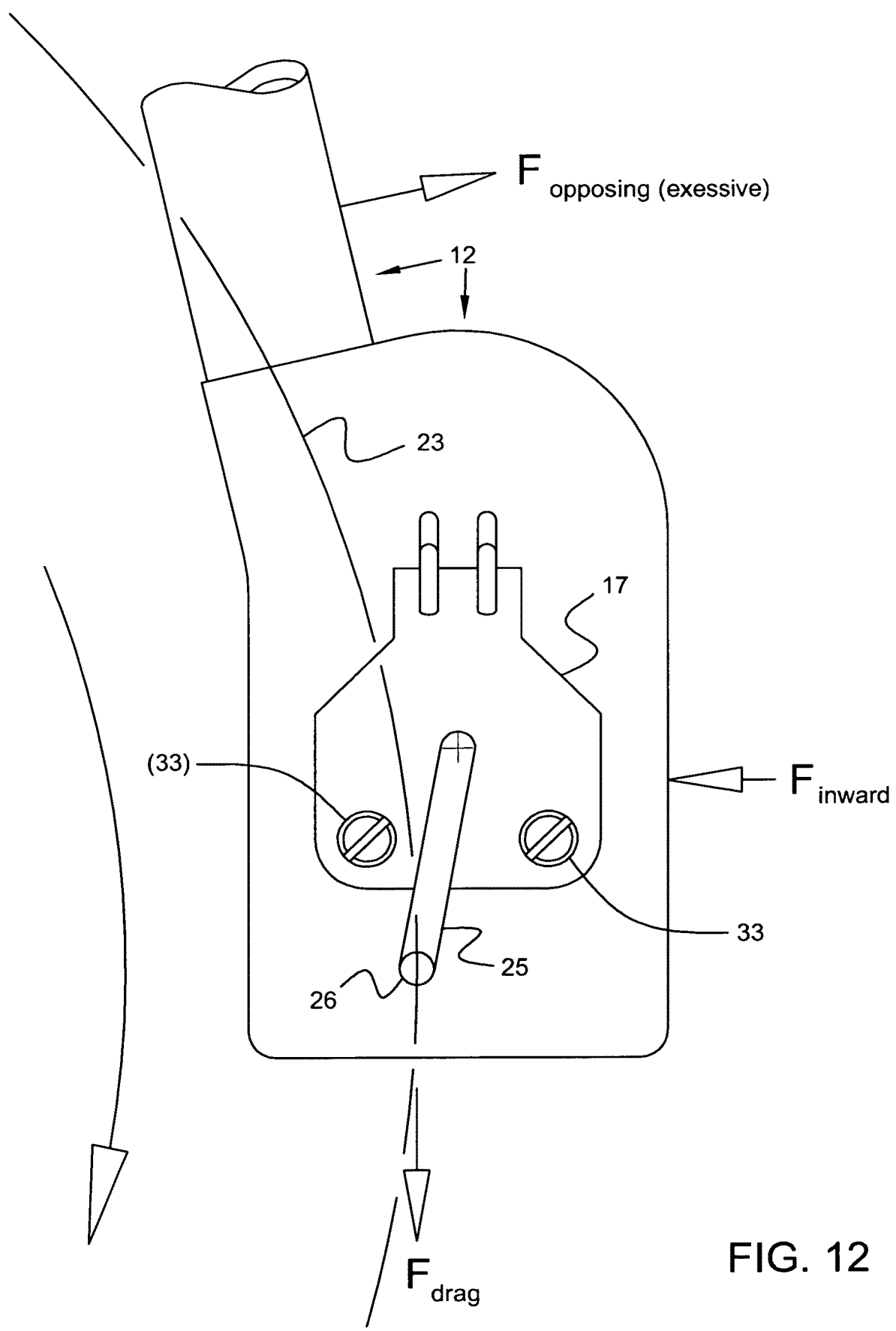
Figure 13:
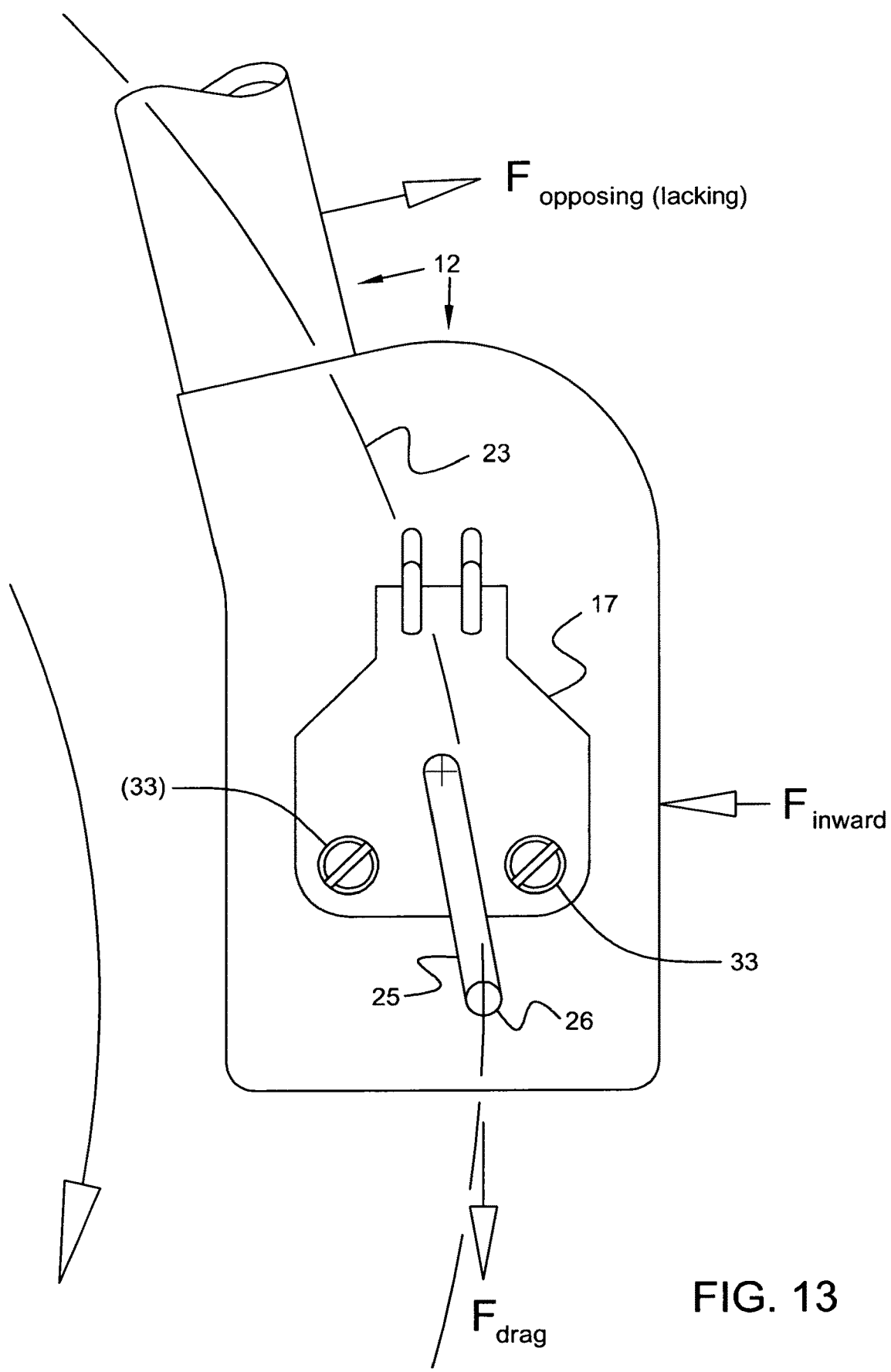

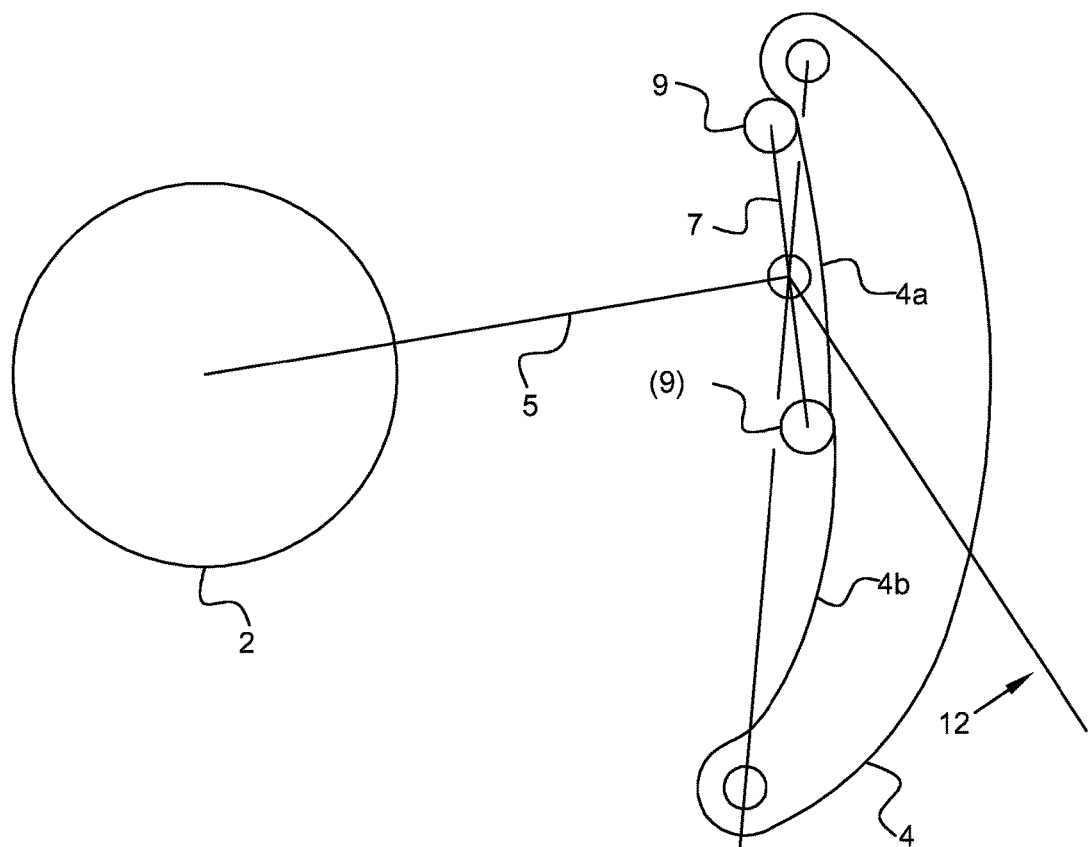
FIG. 5
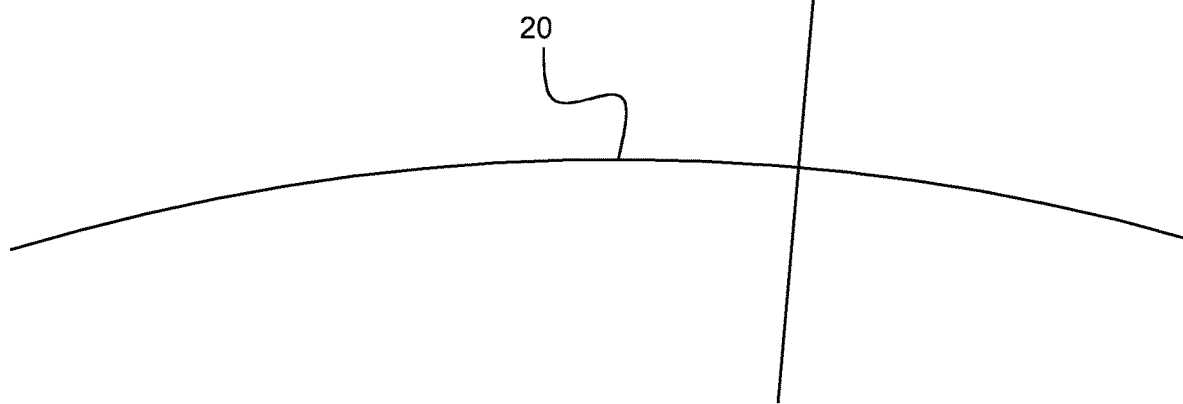

FLOATING HEAD SHELL FOR A SELF PROPELLED, TANGENTIALLY TRACKING TONE ARM

This application claims the benefit of U.S. Provisional Application No. 62/903,713, filed Sep. 20, 2019, which is incorporated by reference herein in its entirety.

All references to left, right, front, rear, horizontal and vertical assume that the observer/narrator is facing the front of a common turn table with the tone arm located to the right of said turn table and the head shell facing the front of said turn table.

BACKGROUND OF THE INVENTION

The present invention applies to the field of gramophones, turn tables and record players, including their various tone arms and it particularly applies to pivoting, tangentially tracking tone arms therefor.

There are many pivoting tone arms that are claimed to be tangentially tracking. They include parallelograms, servo motor drives and designs that are driven by the camming action of the right channel flank of the groove in the record disk. Most of them have head shells that are constrained to the main body of the tone arm. The head shell is that part of the tone arm which is located at the end of the tone arm, which is opposite to the tone arm's pivot. Said head shell serves as a platform for mounting the transducer cartridge which carries the cantilever/stylus assembly that is in contact with the modulated groove of said record disk for playing back the sound contained in said modulated groove. In addition, many of the above tone arms have offset head shells and are subject to the so-called inward force. Said inward force occurs when the vertical center line of the pivot for horizontal rotation of the tone arm does not occupy the vertical center plane of said head shell and where said head shell has been rotated horizontally in a clockwise direction by the designer of the tone arm.

All of the tone arms mentioned in the above paragraph exhibit some degree of tracking error, especially the ones featuring servo motors to drive them.

The center line of said cantilever/stylus assembly occupies the vertical center plane of said transducer cartridge when at rest. Said modulated groove deflects said cantilever/stylus assembly equally to either side of said transducer cartridge's center plane when groove modulation is equal in both channels. When said inward force is present, and is under-compensated, the total excursion of said cantilever/stylus assembly is shifted to that side of said transducer cartridge that faces away from the center of said record disk, and when said inward force is present and is over-compensated, the total excursion of said cantilever/stylus assembly is shifted to that side of said transducer cartridge that faces toward said center of said record disk. The result is excessive wear of the record disk and distortion of the sound during playback.

A serious fault of servo motor driven tangential tone arms is that the servo requires the tone arms to display a small degree of tracking error before said servo can make a correction, thus "crabbing" their way across said record disk by alternating from one side to the other side of true tangency by hundreds of times during the playing time of the average record disk.

BRIEF SUMMARY OF THE INVENTION

It is therefore the general object of my present invention to provide a tangentially tracking tone arm assembly that will overcome the above, as well as other disadvantages of existing tangentially tracking tone arm assemblies.

It is the principal object of my present invention to introduce two new, heretofore unknown components, that I call "The Floating Head Shell", and "The Cradle", applicable to all tone arm assemblies to completely eliminate any and all tracking errors in all existing tone arm assemblies.

It is also an object of my present invention to provide a tangentially tracking tone arm assembly that is driven across said record disk solely by the frictional force between the stylus of said transducer cartridge and said modulated groove in said record disk.

It is another object of my present invention to provide a tangentially tracking tone arm assembly that does not require an active servo to drive the tone arm assembly across the record disk.

It is a further object of my present invention to provide a passive servo that acts in variable opposition to said inward force.

It is yet another object of my present invention to reduce the translation of said tone arm pivot, necessary for tangential tracking, by ~50% as related to my U.S. Pat. No. 4,722,080.

It is a final object of my present invention to provide an offset cradle/head shell combination to utilize said inward force for the purpose of driving said tone arm across the surface of said record disk.

These and other objects, advantages and unique features of my present invention will be more readily apparent from an understanding of the following detailed description of presently preferred embodiments of my invention when considered in conjunction with the accompanying drawings in which:

Drawing 1 represents the preferred embodiment of the tone arm assembly at rest.

Drawing 2 represents the preferred embodiment of the tone arm assembly in a partially exploded condition.

Drawing 3 represents the preferred embodiment of the tone arm assembly in the upside down position.

Drawing 4 represents the preferred embodiment of the tone arm assembly in the start-of-play, mid-play and the end-of-play location with respect to the disk record and also showing the cam and cam follower positions for the above three positions of play. Said floating head shell is not shown for clarity.

Drawing 5 represents an enlarged detail of the cam and cam follower relationship to the start-of-play position of Drawing 4.

Drawing 6 represents an enlarged detail of the cam and cam follower relationship to the mid-play position of Drawing 4.

Drawing 7 represents an enlarged detail of the cam and cam follower relationship to the end-of-play position of Drawing 4.

Drawing 8 represents a partial view of the tone arm assembly with the stylus engaged with the modulated groove while the position of the cradle lags, about to be corrected by the passive servo.

Drawing 9 represents a partial view of the tone arm assembly with the stylus engaged with the modulated groove, while the position of the cradle leads, about to be corrected by the passive servo.

Drawing 10 represents an existing tangentially tracking tone arm showing how it would benefit from my floating head shell.

Drawing 11 represents an existing standard pivoting tone arm showing how it would benefit from my floating head shell.

Drawing 12 represents an existing pivoting tone arm with a fixed head shell, where said inward force is over compensated by the opposing force, resulting in the deflection of the cantilever/stylus assembly from the ideal center position.

Drawing 13 represents an existing pivoting tone arm with a fixed head shell, where said inward force is under compensated by the opposing force, resulting in the deflection of the cantilever/stylus assembly from the ideal center position.

THE FOLLOWING IS A DETAILED DESCRIPTION OF THE PREFERRED EMBODIMENT OF MY PRESENT INVENTION

I like the classical appearance of common pivoting tone arms installed in the upper right hand corner of the vast majority of turn tables.

All turn tables provide a flat surface dedicated to the mounting of all existing tone arms. Base 1 represents said flat surface in drawing 1. Resting upon base 1 is column 2, comprised of a cylinder with an integral mounting flange 2a which is designed to be immovably fastened to said flat surface of base 1.

Projecting from column 2, to the right hand side of the turn table and pivoting about the vertical center line of column 2, is shelf 3. Shelf 3 supports cam means 4 on its top surface and magnet assembly 10 and servo amplifier 6 on its bottom surface. Shelf 3 is designed to be manually rotated by ~30°.

Also projecting from column 2, above shelf 3, and also pivoting about said vertical center line of column 2, is beam 5. Beam 5 supports cam follower housing 7 for rotation in the horizontal plane. Beam 5 is designed to rotate ~30° and does so independently of shelf 3.

Cam follower housing 7 supports cam followers 9 (2) and pivot 8 for rotation in the horizontal plane. When cam follower housing 7 is assembled to integral bearing housing 5a of beam 5, cam followers 9 (2) engage cam means 4. At this point, any rotation of beam 5 causes a corresponding rotation of cam follower housing 7 and vice versa.

Tone arm assembly 12 comprises all of the usual components expected by those skilled in the art, with the special addition of the components that comprise the heart of my present invention, namely cradle assembly 13 and floating head shell assembly 16, located at the front of tone arm assembly 12. Floating head shell assembly 16 comprises phono cartridge 17, attachment means 33 (2), magnet support 18 and magnet 19. The vertical center plane of cradle assembly 13 is offset by ~12° in a clockwise direction with respect to the vertical center plane of the tone arm tube.

Cradle assembly 13 incorporates ball bearing 15 (5) to support floating head shell assembly 16. Four, of ball bearing 15, support floating head shell assembly 16 against gravity, two at the front of cradle assembly 13 and two at the rear of cradle assembly 13. The two ball bearings 15 at the rear of cradle assembly 13 are inclined ~45° toward the front of cradle assembly 13. When floating head shell assembly 16 is placed upon ball bearings 15 (4) it tends to be urged in a forward direction. To check this tendency, a fifth ball bearing 15 is located at the front center of cradle assembly 13 with the pivotal center line disposed perpendicularly with respect to the horizontal plane of cradle assembly 13. This arrangement insures that all ball bearings 15 (5) are loaded and that floating head shell assembly 16 can only move in a lateral direction, perpendicular to the vertical center plane of cradle assembly 13.

When tone arm assembly 12 is assembled to the tone arm bearing locating means in the top of cam follower housing 7, the geometrically perfect feature of my present invention is established.

When tone arm assembly 12 is now pivoted in the horizontal plane to any random location above disk record 21, controlled by the rotation of beam 5, cam follower housing 7 and cam followers 9 (2) and guided by cam means 4, a horizontal line projected from platter spindle 20a of platter 20 and intersecting the center line of cradle assembly 13 in a perpendicular fashion, will be stylus path 27 upon which stylus 26 of transducer cartridge 17 will travel without deviation.

When tone arm assembly 12 is lowered until stylus 26 of transducer cartridge 17 makes contact with the groove in disk record 21, the friction between stylus 26 and rotating disk record 21 immediately pulls floating head shell assembly 16 against ball bearing 5 at the front of cradle assembly 13 thus forcing tone arm assembly 12 and cradle assembly 13 to rotate clockwise by virtue of the inward force being the result of the offset angle of cradle assembly 13. To check this uncontrolled rotation, a voice coil motor is provided and located on the underside of shelf 3. Magnet assembly 10 of the voice coil motor is attached to the under side of shelf 3 and voice coil 11 is attached to beam 5 in such a fashion that it applies an equal and opposite force to beam 5. Because said friction constantly varies based on tracking force, vinyl composition and the modulated content of said groove, a servo amplifier 6 is provided, and is located on the underside of shelf 3 and constantly varying the current supplied to said voice coil motor, synchronous with the variation of said friction. The varying control signal required by servo amplifier 6 to supply the correct amount of current comes from analog Hall Effect sensor 14 located in cradle assembly 13. The output of Hall Effect sensor 14 is governed by magnet 19, hovering above it and being supported by laterally moving floating head shell assembly 16. This arrangement allows floating head shell assembly 16 to follow the groove independently and unhindered by tone arm assembly 12, cradle assembly 13 silently following head shell assembly 16 keeping a position~central to the underside of floating head shell assembly 16. Precise central location of cradle assembly 13 and head shell assembly 16 is not necessary for 100% accurate tangential playback, as long as cradle assembly 13 and head shell assembly 16 do not collide with one another.

A secondary embodiment would apply my invention of the floating head shell assembly 16 and its control servo to tangential tone arms of the type shown on drawing 10. These tone arms allow a small degree of rotation of the tone arm to trigger the servo motor into action. They are not really tangentially tracking tone arms because they constantly rotate fractions of degrees in an alternating clockwise and counterclockwise direction, thus "crabbing" their way across the disk record. They do that hundreds of times per LP side.

Tone arm assembly 12 rolls on carriage path 29 driven by carriage motor 31. The revolutions per minute of carriage motor 31 are determined by the relative position of magnet 19, supported by magnet support 18, being integral to floating head shell assembly 16, to the position of Hall Effect sensor 14, which is integral with cradle assembly 13. As head shell assembly 16 is guided across disk record 21, by the modulated spiral groove, tone arm assembly 12 follows in the manner of the classic follow-up system, well known to those skilled in the art.

A tertiary embodiment would apply my invention of the floating head shell assembly 16, and its control servo, to standard pivoting tone arms of the type shown on drawing 11. The purpose of this embodiment is not tangential tracking, but to eliminate disk record wear and the distortion of the sound contained in the modulated groove upon playback. As everyone knows, standard pivoting tone arms with offset head shells, are subject to the so-called inward force. This force constantly varies while the disk record rotates based on the vinyl composition, the frequency content and the volume level of a given disk record. The various mechanisms employed, known as "antiskating", don't come close to mitigating the effects of the inward force. By applying my invention of the floating head shell to pivoting tone arms, the transducer cartridge is completely isolated from the tone arm proper, thus allowing the head shell/transducer cartridge to follow the modulated groove without interference from the tone arm itself. While the inward force still exists, it does not have to be precisely controlled by the servo, as long as the head shell assembly and the cradle assembly do not collide.

LIST OF REFERENCE CHARACTERS

1) Base
2) Column
2a) Flange
3) Shelf
4) Cam means
4a) First cam surface
4b) Second cam surface
5) Beam
5a) Integral bearing housing
6) Servo amplifier
7) Cam follower housing
8) Cam follower housing pivot
9) Cam follower (one of two)
10) Magnet assembly
11) Voice coil
12) Tone arm assembly
13) Cradle assembly
14) Hall Effect sensor
16) Floating head shell assembly
15) Ball bearing (one of five)
17) Transducer cartridge
18) Magnet support
19) Magnet
20) Platter
20a) Platter spindle
21) Disk record
21a) Label
22) NAB maximum modulated radius
23) Random modulated radius
24) NAB minimum radius, run-out groove
25) Cantilever
26) Stylus
27) Stylus path
28) Carriage
29) Carriage path
30) Carriage wheel
31) Carriage motor
32) Lead screw

What I claim is:

1. A tone arm for disk record players having a first end and a second end, being designed for motion parallel to a play back plane, said play back plane being parallel to a grooved side of a disk record, comprising in combination:
   a) pivot means at said first end of said tone arm for rotation in said play back plane,
   b) cam follower means also at said first end of said tone arm, sharing a coaxial relationship with said pivot means,
   c) stationary cam means, being in constant contact with said cam follower means, for controlled rotation of said tone arm parallel to said play back plane,
   d) carrying means for carrying said tone arm, said pivot means and said cam follower means from a point distal, relative to a center of said disk record, to a point proximal, relative to said center of said disk record,
   e) cradle means at said second end of said tone arm,
   f) a floating head shell, supported by said cradle means, for motion parallel to said play back plane, said floating head shell incorporating attachment means for mounting a transducer cartridge thereto.

2. The tone arm of claim 1, wherein a longitudinal center line of said cradle means occupies a clockwise rotated position relative to a longitudinal center line of said tone arm so that, the angle between said longitudinal center line of said tone arm and said longitudinal center line of said cradle means is less than 45, but not zero degrees, and wherein said cradle means supports said floating head shell upon low-friction means in such a way that, said floating head shell is restrained to one degree of freedom normal to said longitudinal center line of said cradle means.

3. The tone arm of claim 2, wherein the distance between said points distal and proximal is the least that is geometrically possible when said longitudinal center line of said cradle means occupies said clockwise rotated position relative to said longitudinal center line of said tone arm.

4. The tone arm of claim 2, wherein a line, hereafter referred to as the "stylus path", originating at the intersection of said longitudinal center line of said tone arm and said longitudinal center line of said cradle means always passes through said center of said disk record, and where said stylus path always occupies a position normal to said longitudinal center line of said cradle means.

5. The tone arm of claim 4, wherein displacement sensing means disposed between said cradle means and said floating head shell constantly measure the relative position between said cradle means and said floating head shell, and wherein said displacement sensing means relay this information to torque means which apply a variable counter clockwise torque to said tone arm, said variable counter clockwise torque acting substantially concentric to said pivot means.

6. The tone arm of claim 4, wherein a stylus always occupies a position upon said stylus path, and wherein a center line of said transducer cartridge is always positioned normal to the radius of said disk record.

7. The tone arm of claim 6, wherein said stylus path and said radius are collinear.

8. The tone arm of claim 2, wherein the clockwise rotation of said disk record produces a pulling force caused by the frictional engagement between a stylus of said transducer cartridge and a vinyl material of said disk record, and wherein said pulling force causes said tone arm and said cradle means to rotate in a clockwise direction, and wherein said floating head shell in combination with said transducer cartridge and said stylus independently follow a spiral groove in said disk record.

* * * * *